Feb. 14, 1967   D. T. NORDVIK   3,304,203
BATTERY HAVING SEPARATOR BONDED TO AT LEAST ONE ELECTRODE
Filed Aug. 8, 1963

INVENTOR
DONALD T. NORDVIK
BY John E. Stryker
ATTORNEY

United States Patent Office 3,304,203
Patented Feb. 14, 1967

3,304,203
BATTERY HAVING SEPARATOR BONDED TO AT LEAST ONE ELECTRODE
Donald T. Nordvik, Brooklyn Park, Minn., assignor to Gould-National Batteries, Inc., a corporation of Delaware
Filed Aug. 8, 1963, Ser. No. 300,859
2 Claims. (Cl. 136—6)

This invention relates generally to improvements in the construction of alkaline sealed battery cells. More particularly this invention is directed toward improvements in the incorporation of the separators between the electrodes in battery cells of this nature.

In order to point out the objects and features of this invention, there will now be briefly described a typical method of fabricating positive electrodes for use in an alkaline battery cell of the nickel-cadmium type. The electrode or plaque, as it is sometimes referred to, is fabricated by initially depositing a metal powder, such as carbonyl nickel, on the surface of a sheet of an electrically conductive support structure or grid of wire mesh or perforated foil. Steps are taken to ensure that a uniform layer of desired thickness is deposited. The grid filled with the powder is then sintered by subjecting it to a suitable temperature and atmosphere for a predetermined period of time to obtain a plate of desired porosity. Active materials are then introduced into the pores of the plates in vacuo and then precipitated in the porous support structure by electrolysis. Afterwards, individual electrodes of general rectangular shape are cut to the desired size and shape from the large sheet. Although the individual electrodes are preferably of rectangular shape, it should be understood that this invention is not limited to use with this particular configuration and the electrodes of other shapes, such as circular disks, can be used with the resulting advantages and features of this invention. The positive and negative electrodes, with a porous insulating separator layer therebetween, are assembled along with the suitable electrolyte into a casing member and sealed to form the battery cell. The rectangular shaped electrodes may be assembled into a cell of either the flat plate construction or may be coiled into a cylindrical cell configuration. In either of the above mentioned assemblies, or others, it is desirable to make the assemblies compact in order to achieve optimum battery capacity within a limited volume. It has been found that when the electrodes are assembled into the battery cell there is a tendency for the support structure along the edges of the electrodes to pierce through the separator and electrolyte causing electrical shorts in the battery. To alleviate this, additional edge separators have been incorporated in the assembly or a coating layer of some insulative material has been applied to areas along the edges of the electrode. This has resulted in effectively reducing the active surface area of the electrode with a corresponding reduction in the battery capacity, as well as adding a costly and time-consuming step in assembling the battery.

It is, therefore, an object of this invention to provide an alkaline battery cell having increased operational reliability.

It is a further object of this invention to more effectively prevent electrical shorts between electrodes of the sintered type used in alkaline battery cells.

Still a further object of this invention is to achieve the foregoing objects in a compactly constructed battery cell.

It is still a further object of this invention to achieve the foregoing objects with substantially no decrease in the active surface area of the electrode thereby resulting in a larger capacity battery cell for a given size electrode.

Still another object of this invention is to provide economical means for effecting the foregoing objects.

Yet another object of this invention is to achieve the foregoing objects with no substantial increase in the bulk of the battery cell.

In one embodiment of this invention the separator layer of porous insulative material between and coextensive with the facing surfaces of the electrodes is attached directly to one of the facing surfaces of one of the electrodes with a thin coating of porous adhesive material. Preferably, in this embodiment the separator layer overlaps at least one edge of the electrode thereby defining a margin area and the overlapping portion is folded back upon the electrode and adhered thereto along said margin, thereby further insuring against shorts developing between the electrodes along the edge portion. With the separator layer attached directly to the electrode, it becomes an integral portion thereof and therefore augments the compactness of the battery structure. With the separator layers integrated with the respective electrodes in this manner, the flat plate battery cell structure is readily assembled or the electrodes are readily coiled into cylindrical configuration for insertion into a casing member.

In another embodiment of this invention the separator layer is attached to the electrode along at least a marginal portion of an edge with adhesive tape which may be porous or non-porous.

These and other objects and features will be disclosed in the course of the following detailed description with reference to the accompanying drawings in which.

Figures 1, 4:
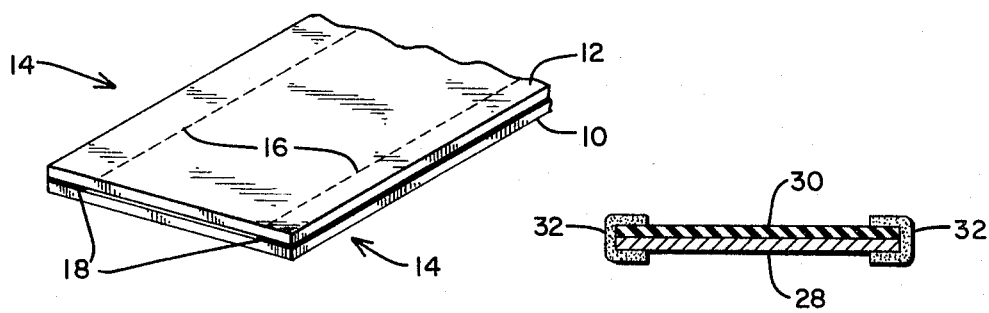
FIGS. 1, 2 and 3 are isometric views of different embodiments of this invention.
FIG. 4 is a cross section view of the embodiment shown in FIG. 3.

Referring now to FIG. 1, there is shown a first embodiment of this invention fabricated according to the teachings of this invention. The bottom rectangularly shaped layer 10 of the two-layer laminar shown in FIG. 1 is a relatively thin, flexible electrode of the flat plate structure variety formed by any well-known process such as previously briefly described whereby a coating of active material is attached to a sintered supporting structure, such as a wire mesh of conductive material or a perforated foil or the like. The top layer 12 of the laminar structure in FIG. 1 is a flexible separator layer fabricated from a porous, electrically insulative material. Separators of this nature and methods for fabricating them are well-known in the art and are not considered part of this invention, therefore no detailed description of same will be included herein. The separator layer completely covers one surface of the electrode 10 so as to be coextensive therewith. Along two parallel longitudinally extending edges of the structure, generally indicated at 14, and for a short distance extending inwardly from said edges, as indicated by dashed lines 16, an inert adhesive coating indicated by the heavy line 18 on the inner surfaces of the separator layer and the electrode bonds the two together. In this manner the separator layer becomes an integral part of the electrode. When assembled to form a flat plate cell, a negative electrode, not shown, generally of the same physical shape and coextensive with the positive electrode forms an additional layer over the separator layer. An appropriate electrolyte, not shown, would also be included. Since the separator plate 12 completely covers the electrode 10 it can be seen that it effectively protects against any of the edges of the sintered electrode penetrating the separator and electrolyte to cause a short between electrodes. Although in the figure it is indicated that the separator layer and electrode are attached to one another with adhesive along only two parallel edges, obviously this can be extended to provide attachment along all four edges. Furthermore, it is contemplated by this invention that the adhesive may be applied throughout the entire inner surfaces of the electrode and separator so that they are uniformly bonded together all along said surfaces. When the separator and electrode are bonded together only along the edge portions, the adhesive material may be non-porous, but when bonded together throughout the facing surfaces, the adhesive must be a porous material. Preferably, a porous material is utilized in both instances in order to provide maximum active electrode surface area for optimum capacity of the battery cell for the given electrode size. Obviously the structure illustrated in FIG. 1 can be extended into a multiple layer or laminar structure comprising alternate layers of electrode and separator (with appropriate electrolyte) to form a compact battery cell of increased capacity. It should be pointed out that tabs of electrically conductive material extending out from the electrodes to provide electrical connection thereto and which are normally welded to the electrodes are not shown for purposes of clarity. However, these tabs would be included in any battery structure. A particularly advantageous feature of the embodiment illustrated in part in FIG. 1, but in which the adhesive layer extends throughout the facing surfaces between the separator and the electrode, is that the separator layer may be attached to a large sheet of sintered electrode material prior to cutting the electrodes to the desired size and shape. This embodiment, therefore, is readily adaptable to mass production techniques with resulting time and cost savings.

Figure 2:
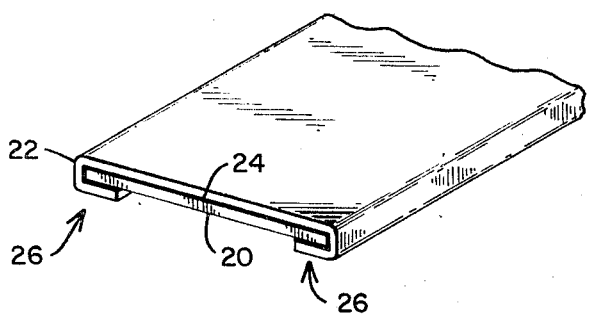

A further embodiment of this invention is illustrated in FIG. 2 which shows a generally flat laminar structure comprising an electrode 20, separator layer 22 and a coating of inert adhesive at 24 bonding the two together along the inner facing surfaces. In this embodiment the separator layer 22 overlaps the electrode 20 along the two parallel, longitudinally extending edges and is folded back over these edges, as indicated at 26. As indicated in FIG. 2, the adhesive layer extends throughout the inner facing surfaces of the electrode and the separator layer and is, therefore, of the porous type. Although the figure illustrates the separator layer being folded back along only two edges of the electrode, it is obvious that this can be extended so that the separator layer overlaps and is folded back and attached to the electrode by the adhesive layer along all four edges. In constructing the embodiment shown in FIG. 2, the sintered electrode and the separator layer are initially cut to the required size. Adhesive is then applied to the inner surface of either the electrode or the separator layer or to both and then one is centrally located and laid on top of the other so that the separator overlaps the electrode plaque along the edges. The margin defined by the overlap is folded back onto the electrode and the adhesive is then allowed to set to form the integral structure of electrode and separator layer. The particular advantageous feature of the embodiment illustrated in FIG. 2 is that folding the separator layer over the edges of the electrode further ensures against the possibility of any shorts between the electrodes occurring along said edges. It is further contemplated by this invention that the embodiment illustrated in FIG. 2 can be further expanded by attaching separator material with a porous adhesive to the bottom surface of the electrode 20 thereby completely enveloping the electrode with the integrally attached separator. While this may add some bulk to the battery cell when the positive and negative electrodes are assembled along with the required electrolyte, there is provided further reliance against electrical shorts developing between electrodes within the battery cell.

Figure 3:
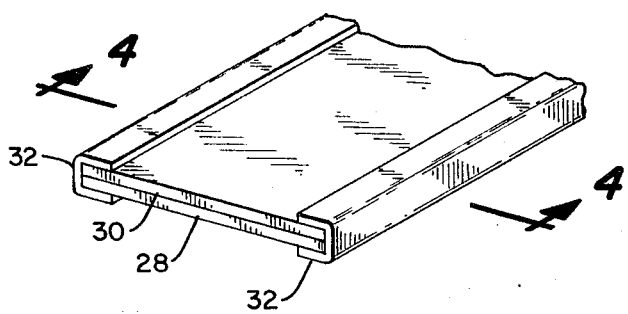

In the embodiment of this invention illustrated in FIG. 3, with a cross-sectional view in FIG. 4, the electrode 28 and the separator layer 30 are in juxtaposition and the two are attached to one another by strips of adhesive tape 32 along two parallel, longitudinally extending edges. The tape is folded back upon the separator layer and the electrode thereby defining a margin over which the two are attached to one another. Preferably, the tape is of a porous material such as Scotch Brand Surgical Tape #530 manufactured by Minnesota Mining & Manufacturing Company, but need not be porous. A porous tape material of course results in a larger active electrode surface with a resulting increase in the battery capacity for the given electrode size. It is contemplated by this invention that the embodiment illustrated in FIGS. 3 and 4 can be extended such that all four edges of the separator and electrode are marginally taped together. Similar to the embodiment illustrated in FIG. 2, that shown in FIG. 3 with the edges of the electrode completely covered by the tape ensures against electrical shorts developing between electrodes along said edges.

Figure 5:
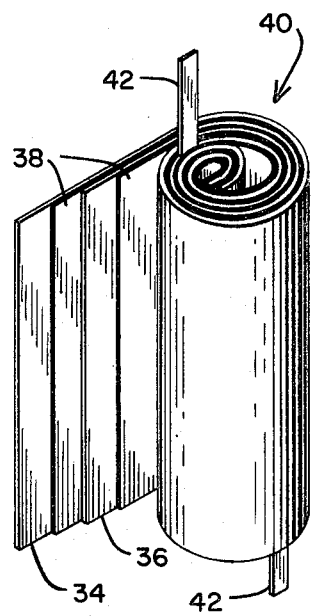
FIG. 5 illustrates an embodiment of this invention with the electrodes coiled into cylindrical configuration.

The embodiments shown in FIGS. 1–4 have been described with relation to use in construction of battery cells of the flat plate structure. FIG. 5 illustrates how this invention can be incorporated in the construction of a cylindrical battery cell. The cylindrical structure is illustrated as being formed from the integral electrode-separator embodiment illustrated in FIG. 1, although no limitation thereto is intended. The generally rectangularly shaped positive and negative electrodes 34 and 36, respectively, with the separator layers 38 bonded thereto with a suitable porous adhesive, are coiled into the general cylindrical shape indicated at 40. Of course, suitable electrolyte to provide the required chemical reaction must also be included but it is not shown for the purposes of clarity. Tabs 42 for making external electrical connections to the positive and negative electrodes of the battery cell are normally spot welded to the respective electrodes and extend outwardly in an axial direction from the cylindrical structure as shown. The electrodes, with their attached separators, are coiled as indicated with the separator layers inward with respect to the electrodes to which they are attached. This is to prevent tearing or rupturing of the separator layer which might occur if the separator layer were coiled at a radius from the axis of the cylinder longer than the radius of curvature of the electrode to which it is attached. When coiled in this manner the coil convolutions form a cylinder structure having a cross-sectional laminar wall. Radially outward from the axis of the cylinder there are alternate layers of electrode and separator (along with the electrolyte) with each of the respective layers of separator being radially closer to the axis than the corresponding layer of electrode to which the respective separator layers are attached. Since the separator layers are co-extensive with the respective electrodes, thereby protecting against shorts especially along the edges of the electrodes, the previously required additional separators or insulative coatings along the top and bottom of the cylinder are no longer necessary. This provides economical and faster assembly of the cell into a cylindrical structure and further results in a more compact unit.

Obviously, any integral electrode-separator structure constructed according to the teachings of this invention can be used in the construction of the cylindrical cell illustrated in FIG. 5 with the resulting advantageous features. For example, the structure described with relation to the embodiment illustrated in FIG. 2 wherein the electrode is completely enveloped by the attached separator layer may be highly advantageous since in the event any rupture of a separator layer occurs during coiling, there will be an adjacent separator layer to insure against any electrical shorts between the electrodes. This will result in a battery cell of slightly increased bulk but will have increased reliability.

Although this invention has been described with respect to generally rectangularly shaped electrode and separator layers, no limitation thereto is intended. It is contemplated that the teachings of this invention are equally applicable to other electrode configurations, for example, circular disk-like electrodes or combinations of electrodes with various configurations. The novel concept of attaching the separator layer directly to the electrode by suitable adhesive means, effects the achievement of the advantageous objects and features which satisfy a long-felt need in the battery industry. Although multiple layer construction of alternate layers of the electrode and separator has been particularly described only with relation to the embodiments of FIGS. 1 and 5, obviously this type of structure is readily fabricated using other embodiments constructed according to the teachings of this invention.

What is claimed is:

1. In a battery having oppositely polarized electrodes which have generally coextensive, parallel, spaced-apart, facing surfaces the improvement in combination therewith comprising: a porous insulative separator layer between said facing surfaces and coextensive therewith contoured in general conformance to said surfaces, said separator overlapping at least one of the electrodes along at least one edge thereof, with the overlap folded back over the electrode; and a layer of inert adhesive material between the electrode and the overlap for bonding the separator to the electrode.

2. The invention as described in claim 1 wherein the electrodes and separator layers are spirally coiled to generally define a cylinder having an axis disposed closer to the respective separator layers than to the corresponding electrodes to which said respective separator layers are adhesively bonded.

References Cited by the Examiner

UNITED STATES PATENTS

| | | | |
|---|---|---|---|
| 2,653,986 | 9/1953 | Philipps | 136—145 |
| 3,007,993 | 11/1961 | Haring. | |
| 3,023,259 | 2/1962 | Coler et al. | 136—28 X |
| 3,023,260 | 2/1962 | Coler et al. | 136—28 X |
| 3,069,486 | 12/1962 | Solomon et al. | 136—120 X |
| 3,072,558 | 1/1963 | Myers et al. | 136—120 X |
| 3,184,339 | 5/1965 | Ellis | 136—120 X |
| 3,201,280 | 8/1965 | Yumoto | 136—6 X |

WINSTON A. DOUGLAS, *Primary Examiner.*

B. OHLENDORF, *Assistant Examiner.*